(12) United States Patent
Chen et al.

(10) Patent No.: US 11,960,153 B2
(45) Date of Patent: Apr. 16, 2024

(54) FOLDING LENS SYSTEM AND MANUFACTURING METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Po Lun Chen, Guangdong (CN); Yun Pei Chen, Guangdong (CN); Hui-Ping Shen, Guangdong (CN); Ting-Huei Chen, Guangdong (CN); Wei-Hung Tsay, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/052,208

(22) Filed: Nov. 3, 2022

(65) Prior Publication Data
US 2024/0061281 A1 Feb. 22, 2024

(30) Foreign Application Priority Data
Aug. 17, 2022 (CN) .......................... 202210988296.7

(51) Int. Cl.
*G02F 1/01* (2006.01)
*B32B 1/00* (2006.01)
(Continued)

(52) U.S. Cl.
CPC .............. *G02F 1/0136* (2013.01); *B32B 1/00* (2013.01); *B32B 17/06* (2013.01); *B32B 37/18* (2013.01);
(Continued)

(58) Field of Classification Search
None
See application file for complete search history.

(56) References Cited

U.S. PATENT DOCUMENTS

7,475,985 B2 * 1/2009 Blum ................... A61B 3/0285
351/159.42
11,126,040 B2 * 9/2021 Yadin .................. G02F 1/13439
(Continued)

*Primary Examiner* — Ryan Crockett
(74) *Attorney, Agent, or Firm* — CKC & Partners Co., LLC (57) ABSTRACT

A folding lens system includes: a polarization-dependence device, a first optical device, a first polarization controller, a second optical device and a second polarization controller. The polarization-dependence device has a first surface and a second surface opposite to the first surface. The first optical device is located at a side facing toward the first surface of the polarization-dependence device. The first polarization controller is located between the polarization-dependence device and the first optical device. The first polarization controller has the same curvature as the first surface of the polarization-dependence device. The second optical device is located at a side facing toward the second surface of the polarization-dependence device. The second polarization controller is located between the polarization-dependence device and the second optical device. The second polarization controller has the same curvature as the second surface of the polarization-dependence device.

17 Claims, 7 Drawing Sheets

(51) Int. Cl.
  *B32B 17/06* (2006.01)
  *B32B 37/18* (2006.01)
  *G02F 1/13363* (2006.01)

(52) U.S. Cl.
  CPC ...... *G02F 1/13363* (2013.01); *B32B 2307/42* (2013.01); *B32B 2551/00* (2013.01)

(56) References Cited

U.S. PATENT DOCUMENTS

| | | | | |
|---|---|---|---|---|
| 11,624,864 | B2* | 4/2023 | Wang | G02B 5/3016 349/194 |
| 2002/0158866 | A1* | 10/2002 | Batchko | H04N 13/388 345/419 |
| 2016/0116718 | A1* | 4/2016 | Hsu | G02B 5/208 359/356 |
| 2016/0170097 | A1* | 6/2016 | Milton | G02C 7/041 349/200 |
| 2017/0059917 | A1* | 3/2017 | Kao | G02F 1/133308 |
| 2017/0357141 | A1* | 12/2017 | De Smet | G02C 7/083 |
| 2018/0299611 | A1* | 10/2018 | Wang | G02F 1/1337 |
| 2019/0202173 | A1* | 7/2019 | Fukatani | B32B 27/08 |
| 2020/0341315 | A1* | 10/2020 | Gollier | G02B 1/08 |
| 2021/0247627 | A1* | 8/2021 | Lee | B29D 11/0073 |
| 2022/0283351 | A1* | 9/2022 | Shibata | G09F 9/30 |
| 2023/0098100 | A1* | 3/2023 | Yamada | B29D 11/00865 349/194 |
| 2023/0140081 | A1* | 5/2023 | Drammeh | B29D 11/00634 428/215 |
| 2023/0141566 | A1* | 5/2023 | Jiang | B32B 37/10 156/349 |
| 2023/0168420 | A1* | 6/2023 | Tamura | G02B 5/3033 359/483.01 |

* cited by examiner

FOLDING LENS SYSTEM AND MANUFACTURING METHOD THEREOF

RELATED APPLICATION

This application claims priority to China Application Serial Number 202210988296.7, filed Aug. 17, 2022, which is herein incorporated by reference in its entirety.

BACKGROUND

Field of Invention

The present disclosure relates to a folding lens system and a manufacturing method of the folding lens system.

Description of Related Art

In general, a folding lens system typically uses polarization-dependence devices and polarization controllers to switch diopter of the folding lens system. However, an air gap may be located between the polarization-dependence device and the polarization controller of the folding lens system. That is, the polarization-dependence device and the polarization controller are not laminated together, thus increasing an overall thickness of the folding lens system, which is disadvantageous for miniaturized applications of the folding lens system. In addition, the polarization controller of the folding lens system may have a planar surface, so the diopter of light incident on the polarization controller may not be able to adjust according to the requirements.

SUMMARY

An aspect of the present disclosure is related to a folding lens system.

According to one embodiment of the present disclosure, a folding lens system includes a polarization-dependence device, a first optical device, a first polarization controller, a second optical device and a second polarization controller. The polarization-dependence device has a first surface and a second surface opposite to the first surface. The first optical device is located at a side facing toward the first surface of the polarization-dependence device. The first polarization controller is located between the polarization-dependence device and the first optical device. The first polarization controller has the same curvature as the first surface of the polarization-dependence device. The second optical device is located at a side facing toward the second surface of the polarization-dependence device. The second polarization controller is located between the polarization-dependence device and the second optical device. The second polarization controller has the same curvature as the second surface of the polarization-dependence device.

In one embodiment of the present disclosure, the first polarization controller is laminated to the first surface of the polarization-dependence device.

In one embodiment of the present disclosure, the second polarization controller is laminated to the second surface of the polarization-dependence device.

In one embodiment of the present disclosure, the first optical device has a third surface and a fourth surface opposite to the third surface, and the third surface is a planar surface.

In one embodiment of the present disclosure, the fourth surface of the first optical device is laminated to the first polarization controller.

In one embodiment of the present disclosure, the fourth surface of the first optical device is a curved surface.

In an embodiment of the present disclosure, the folding lens system further includes a display. The display is located at a side of the first optical device facing away from the first polarization controller. The display is configured to emit light to the second polarization controller.

In one embodiment of the present disclosure, the folding lens system further includes a quarter-wave plate. The quarter-wave plate is located between the display and the first optical device.

In one embodiment of the present disclosure, the folding lens system further includes a transflective film. The transflective film is located on a surface of the quarter-wave plate facing toward the display.

In one embodiment of the present disclosure, the second optical device has a fifth surface and a sixth surface opposite to the fifth surface, and the fifth surface is a curve surface.

In one embodiment of the present disclosure, the folding lens system further includes a polarization reflective film. The polarization reflective film is located on the sixth surface of the second optical device.

In an embodiment of the present disclosure, the sixth surface of the second optical device is a planar surface.

In an embodiment of the present disclosure, the polarization-dependence device, the first optical device, the second optical device, the first polarization controller, and the second polarization controller are aligned in a horizontal direction.

In an embodiment of the present disclosure, the first polarization controller has a plurality of first liquid crystals, the polarization-dependence device has a plurality of second liquid crystals, and an arrangement direction of the first liquid crystals is different from an arrangement direction of the second liquid crystals.

An aspect of the present disclosure is related to a manufacturing method of a folding lens system.

According to one embodiment of the present disclosure, a manufacturing method of a folding lens system includes: laminating a first polarization controller to a first surface of a polarization-dependence device, wherein the first polarization controller has the same curvature as the first surface of the polarization-dependence device; laminating a second polarization controller to a second surface of the polarization-dependence device opposite to the first surface, wherein the second polarization controller has the same curvature as the second surface of the polarization-dependence device; laminating a first optical device to a side of the first polarization controller facing away from the polarization-dependence device; and laminating a second optical device to a side of the second polarization controller facing away from the polarization-dependence device.

In one embodiment of the present disclosure, the method further includes disposing a display at a side of the first optical device facing away from the first polarization controller, wherein the display is configured to emit light to the second polarization controller.

In one embodiment of the present disclosure, the method further includes: forming a transflective film on a surface of a quarter-wave plate; and laminating the quarter-wave plate to a third surface of the first optical device, wherein the first optical device has a fourth surface opposite to the third surface, and the fourth surface is a curved surface.

In one embodiment of the present disclosure, the second optical device has a fifth surface and a sixth surface opposite to the fifth surface. The method further includes forming a polarization reflective film on the sixth surface of the second optical device.

In one embodiment of the present disclosure, laminating the first optical device and the second optical device is performed such that the polarization-dependence device, the first optical device, the second optical device, the first polarization controller, and the second polarization controller are aligned in a horizontal direction.

In the embodiments of the present disclosure, the first polarization controller of the folding lens system has the same curvature as the first surface of the polarization-dependence device, and the second polarization controller has the same curvature as the second surface of the polarization-dependence device, so the first polarization controller and the second polarization controller may be laminated to the first surface and the second surface of the polarization-dependence device, respectively. An overall thickness of the folding lens system may be reduced, which is advantageous to miniaturization of the folding lens system. In addition, diopter of light incident on the first polarization controller may be able to adjust according to the curvature of the first polarization controller, so aberration may be corrected and optical imaging quality may be improved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one device or feature's relationship to another device(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
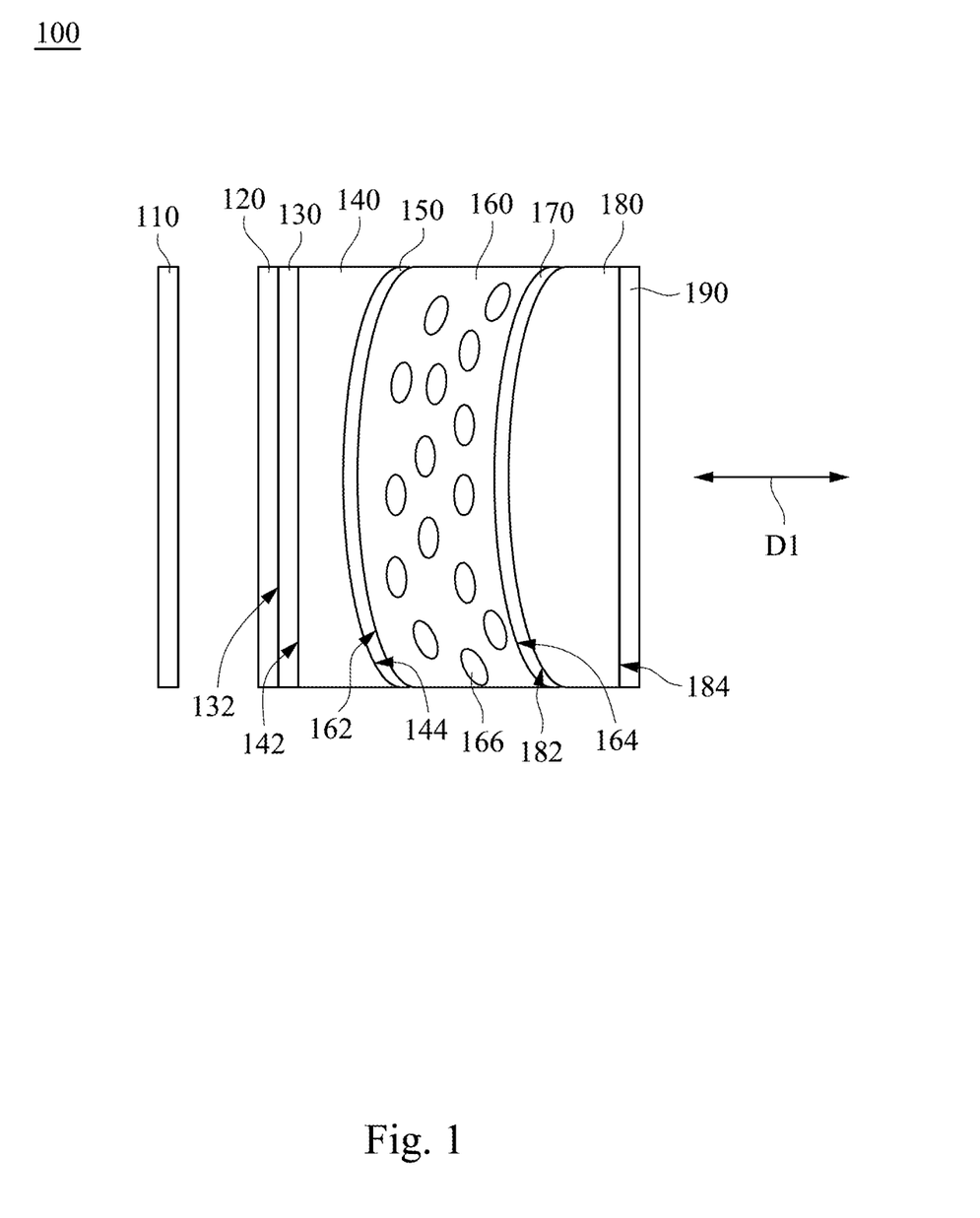
FIG. 1 illustrates a schematic view of a folding lens system according to one embodiment of the present disclosure.

FIG. 1 illustrates a schematic view of a folding lens system 100 according to one embodiment of the present disclosure. Referring to FIG. 1, the folding lens system 100 includes a display 110, a transflective film 120, a quarter-wave plate 130, a first optical device 140, a first polarization controller 150, a polarization-dependence device 160, a second polarization controller 170, and a second optical device 180. For example, the folding lens system 100 may be applied to a head mounted display. The display 110 may be located at a side of the first optical device 140 facing away from the first polarization controller 150. That is, the display 110 may be located at the left side of the first optical device 140. The quarter-wave plate 130 may be located between the display 110 and the first optical device 140, and the transflective film 120 may be located on a surface 132 of the quarter-wave plate 130 facing toward the display 110.

In some embodiments, the polarization-dependence device 160 has a first surface 162 and a second surface 164 opposite the first surface 162. For example, the polarization-dependence device 160 may be a polarization-dependence aspheric lens. The first optical device 140 may be located at a side of the polarization-dependence device 160 facing toward the first surface 162. That is, the first optical device 140 may be located at the left side of the polarization-dependence device 160. For example, the first optical device 140 may be an aspherical lens. The first polarization controller 150 may be located between the first optical device 140 and the polarization-dependence device 160. The second optical device 180 may be located at a side of the polarization-dependence device 160 facing toward the second surface 164. That is, the second optical device 180 may be located at the right side of the polarization-dependence device 160. For example, the second optical device 180 may be an aspherical lens. The second polarization controller 170 may be located between the polarization-dependence device 160 and the second optical device 180. For example, the first polarization controller 150 and the second polarization controller 170 may be curved twisted nematic (TN) liquid crystal polarization controllers.

It is to be noted that the first polarization controller 150 has the same curvature as the first surface 162 of the polarization-dependence device 160, and the second polarization controller 170 has the same curvature as the second surface 164 of the polarization-dependence device 160. In addition, the first optical device 140, the first polarization controller 150, the polarization-dependence device 160, the second polarization controller 170, and the second optical device 180 are aligned in a horizontal direction D1.

Particularly, the first polarization controller 150 of the folding lens system 100 has the same curvature as the first surface 162 of the polarization-dependence device 160, and the second polarization controller 170 has the same curvature as the second surface 164 of the polarization-dependence device 160, so the first polarization controller 150 and the second polarization controller 170 may be laminated to the first surface 162 and the second surface 164 of the polarization-dependence device 160, respectively. An overall thickness of the folding lens system 100 may be reduced, which is advantageous to miniaturization of the folding lens system 100. In addition, diopter of light L1 (will be described in FIG. 2) incident on the first polarization controller 150 may be able to adjust according to the curvature of the first polarization controller 150, so aberration may be corrected and optical imaging quality may be improved.

Figure 2:
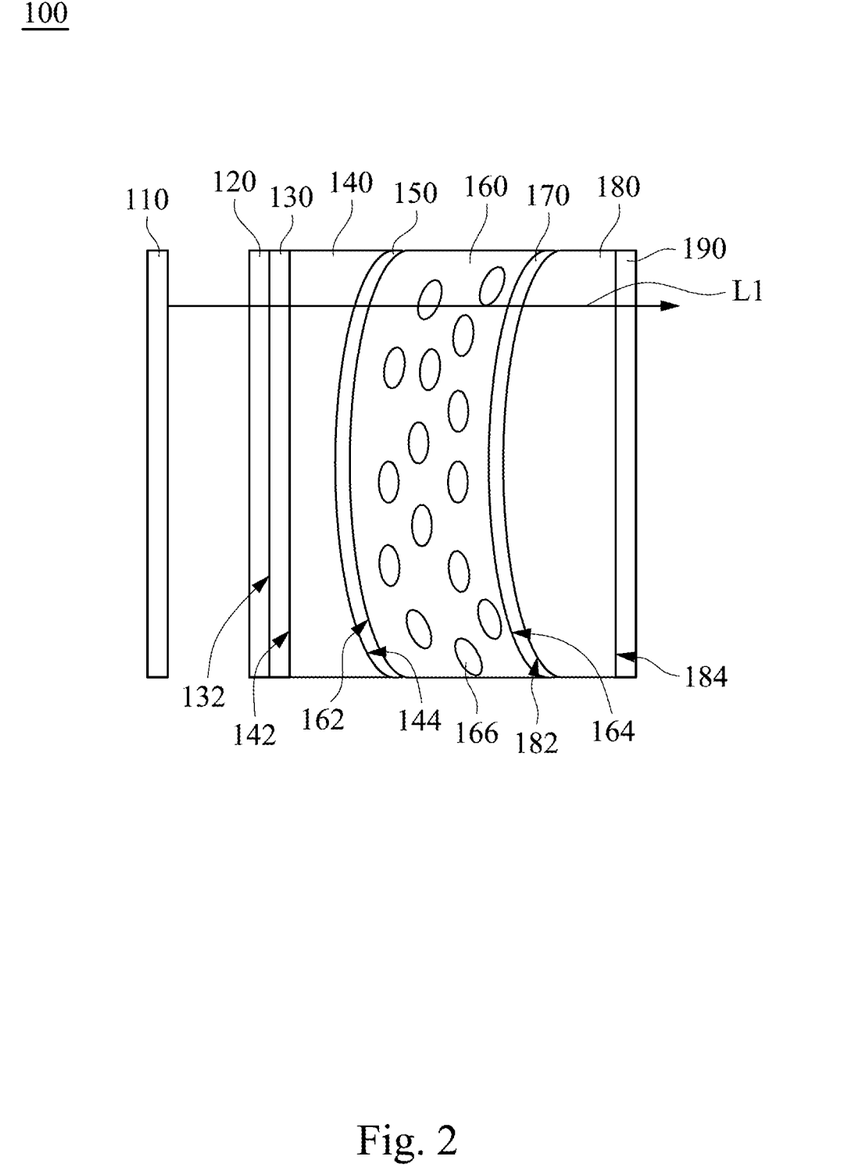
FIG. 2 and FIG. 3 illustrate schematic views that the folding lens system in FIG. 1 is operated.
Figure 3:
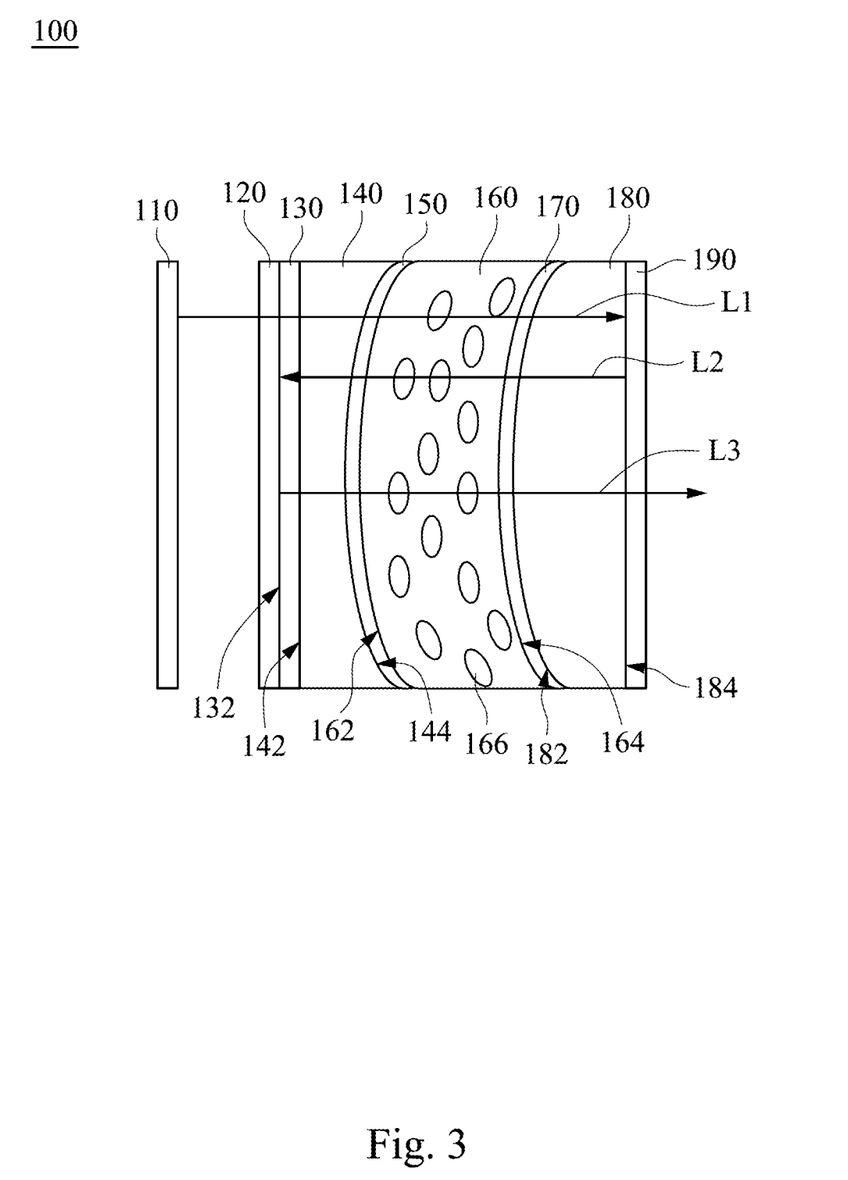

FIG. 2 and FIG. 3 illustrate schematic views that the folding lens system 100 in FIG. 1 is operated. Referring to FIG. 2, the first optical device 140 has a third surface 142 and a fourth surface 144 opposite the third surface 142. The third surface 142 of the first optical device 140 is a planar surface, and the fourth surface 144 of the first optical device 140 is a curved surface. It is to be noted that the fourth surface 144 of the first optical device 140 may be laminated to the first polarization controller 150, so an overall thickness of the folding lens system 100 may be reduced, which is advantageous to miniaturization of the folding lens system 100. In the description herein, an optical clear adhesive may be used for laminating.

In some embodiments, the second optical device 180 has a fifth surface 182 and a sixth surface 184 opposite the fifth surface 182. The sixth surface 184 of the second optical device 180 is a planar surface, and the fifth surface 182 of the second optical device 180 is a curved surface, so the fifth surface 182 of the second optical device 180 may be laminated to the second polarization controller 170. An overall thickness of the folding lens system 100 is reduced. The folding lens system 100 further includes a polarization reflective film 190. The polarization reflective film 190 is located on the sixth surface 184 of the second optical device 180. In some embodiments, the display 110 is configured to emit the light L1 to the first polarization controller 150, the polarization-dependence device 160 and the second polarization controller 170.

In this embodiment, the display 110 may emit the light L1 which is left circular polarization. The light L1 emitted by the display 110 may be converted to horizontal linear polarization after passing through the quarter-wave plate 130. When the first polarization controller 150 is turned on (a voltage is provided) and the second polarization controller 170 is turned off (no voltage is provided), the light L1 may pass through the polarization reflective film 190 such that a light path may not be folded. The diopter of the folding lens system 100 may be expressed as $P_{140}+P_{180}+P_o \cdot P_{140}$ may be the diopter of the light L1 passing through the first optical device 140, $P_{180}$ may be the diopter of the light L1 passing the second optical device 180, and $P_o$ may be the diopter of ordinary light passing through polarization-dependence device 160.

In addition, when the first polarization controller 150 is turned off (no voltage is provided) and the second polarization controller 170 is turned on (a voltage is provided), the diopter of the folding lens system 100 may be expressed as $P_{140}+P_{180}+P_e \cdot P_{140}$ may be the diopter of the light L1 passing through the first optical device 140, $P_{180}$ may be the diopter of the light L1 passing through the second optical device 180, and $P_e$ may be the diopter of extraordinary light passing through the polarization-dependence device 160.

Referring to FIG. 3, the display 110 may emit the light L1 which is left circular polarization. The light L1 emitted by the display 110 may be converted to horizontal linear polarization after passing through the quarter-wave plate 130. When the first polarization controller 150 is turned on (a voltage is provided) and the second polarization controller 170 is turned on (a voltage is provided), the polarization reflective film 190 may reflect light L2, so that the light L2 sequentially passes through the second optical device 180, the second polarization controller 170, the polarization-dependence device 160, the first polarization controller 150, the first optical device 140, the quarter-wave plate 130, and the transflective film 120. After passing through the quarter-wave plate 130, the light L2 may be converted to left circular polarization. The transflective film 120 may reflect light L3, so the light L3 is converted to right circular polarization, and after passing through the quarter-wave plate 130, the light L3 is converted to vertical polarization and sequentially passes through the first optical device 140, the first polarization controller 150, the polarization-dependence device 160, the second polarization controller 170, the second optical device 180 and the polarization reflective film 190. The diopter of the folding lens system 100 may be expressed as $3(P_{140}+P_{180})+P_e+2P_o$.

In addition, when the first polarization controller 150 is turned off (no voltage is provided) and the second polarization controller 170 is turned off (no voltage is provided), the polarization reflective film 190 may reflect the light L2, and a light path may be folded. After passing through the quarter-wave plate 130, the light L2 may be converted to left circular polarization. The transflective film 120 may reflect the light L3, and a light path may be folded. The light L3 may be converted to right circular polarization. The light L3 may be converted to vertical polarization after passing through the quarter-wave plate 130. Therefore, the light path is folded three times, and the diopter of the folding lens system 100 may be expressed as $3(P_{140}+P_{180})+2P_e+P_o$.

It is to be noted that the connection relationship of the aforementioned devices will not be repeated. In the following description, a manufacturing method of a folding lens system will be described.

Figure 4:
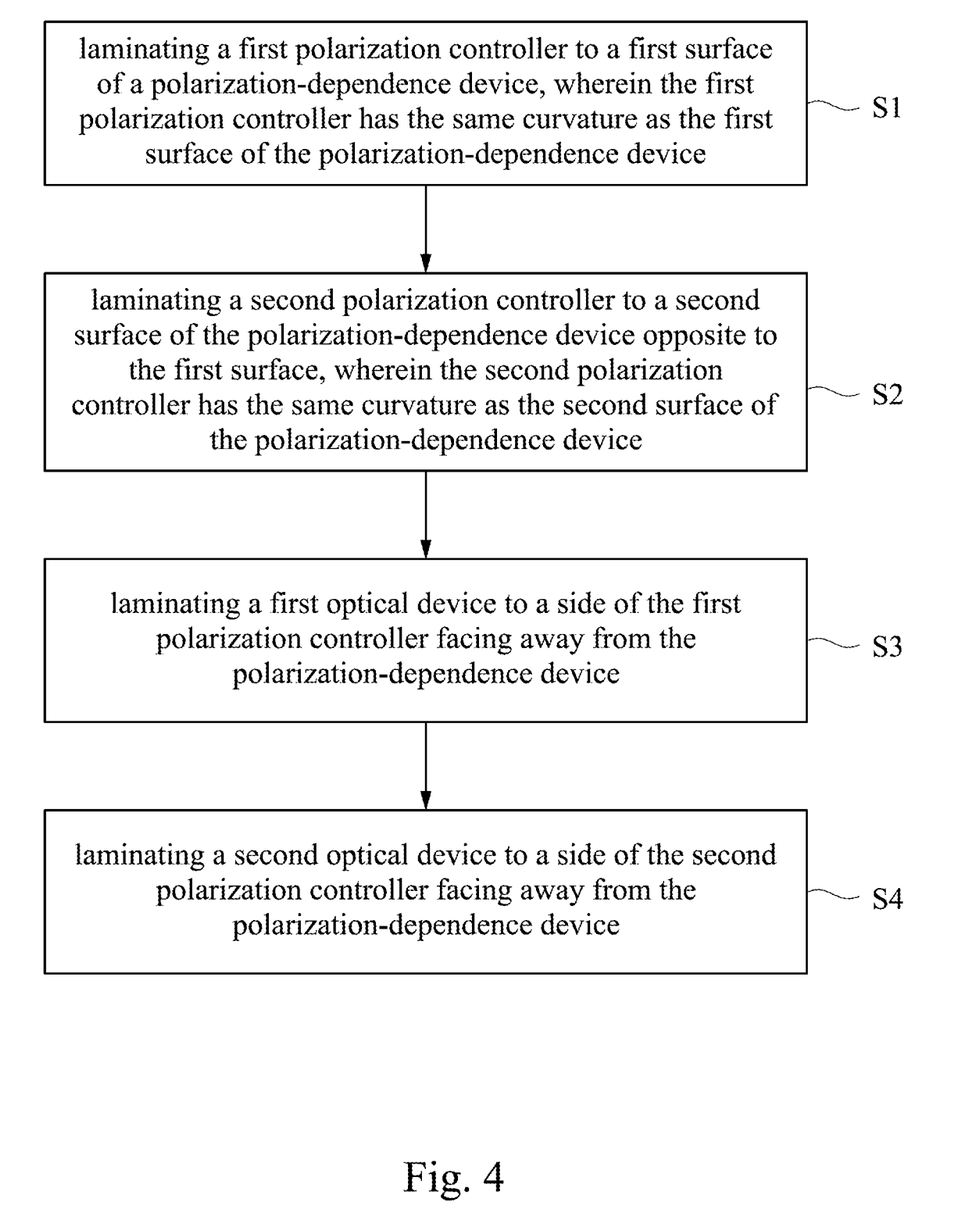
FIG. 4 illustrates a flow chart of a manufacturing method of folding lens system according to one embodiment of the present disclosure.

FIG. 4 illustrates a flow chart of a manufacturing method of a folding lens system according to one embodiment of the present disclosure. The manufacturing method of the folding lens system includes steps as outlined below. In step S1, laminating a first polarization controller to a first surface of a polarization-dependence device, wherein the first polarization controller has the same curvature as the first surface of the polarization-dependence device. In step S2, laminating a second polarization controller to a second surface of the polarization-dependence device opposite to the first surface, wherein the second polarization controller has the same curvature as the second surface of the polarization-dependence device. In step S3, laminating a first optical device to a side of the first polarization controller facing away from the polarization-dependence device. In step S4, laminating a second optical device to a side of the second polarization controller facing away from the polarization-dependence device. In the following description, the aforementioned steps will be described in detail.

Figure 5:
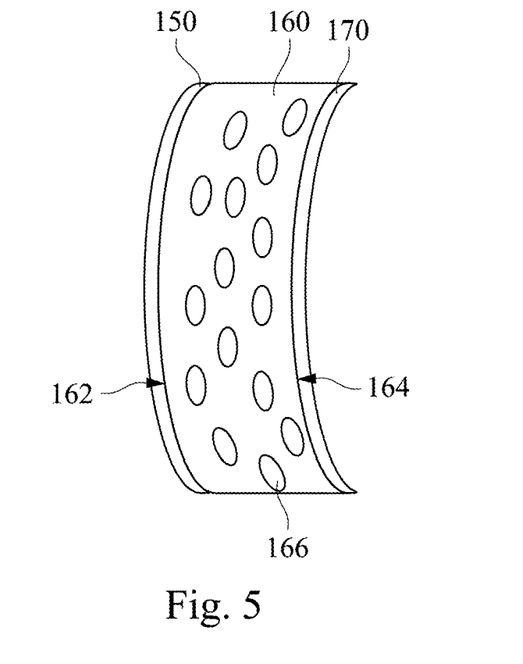
FIG. 5 and FIG. 6 illustrate schematic views at various steps of a manufacturing method of a folding lens system according to one embodiment of the present disclosure.
Figure 6:
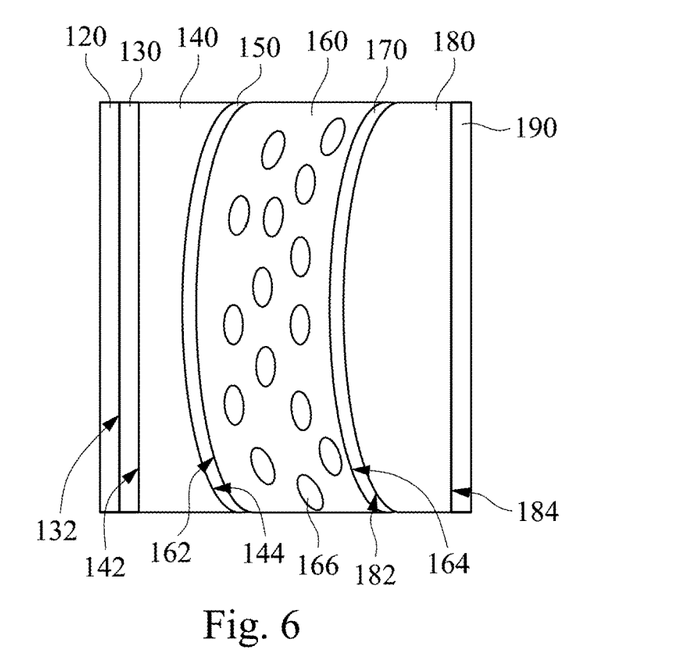

FIG. 5 and FIG. 6 illustrate schematic views at various steps of a manufacturing method of a folding lens system according to one embodiment of the present disclosure. Referring to FIG. 5, first, the first polarization controller 150 may be laminated to the first surface 162 of the polarization-dependence device 160. The first polarization controller 150 has the same curvature as the first surface 162 of the polarization-dependence device 160. Next, the second polarization controller 170 may be laminated to the second surface 164 of the polarization-dependence device 160 opposite to the first surface 162. The second polarization controller 170 has the same curvature as the second surface 164 of the polarization-dependence device 160.

Referring to FIG. 6, the transflective film 120 may be formed on the surface 132 of the quarter-wave plate 130. Next, the quarter-wave plate 130 may be laminated to the third surface 142 of the first optical device 140, and the first optical device 140 may be laminated to a side (such as the left side) of the first polarization controller 150 facing away from the polarization-dependence device 160. Therefore, an overall thickness of the folding lens system 100 may be reduced. In addition, the manufacturing method further includes forming the polarization reflective film 190 on the sixth surface 184 of the second optical device 180.

Referring back to FIG. 1, The manufacturing method further includes disposing the display 110 at a side (such as the left side) of the first optical device 140 facing away from the first polarization controller 150. In some embodiments, the first optical device 140 is laminated to the first polarization controller 150, and the second optical device 180 is laminated to the second polarization controller 170. Therefore, the first optical device 140, the first polarization controller 150, the polarization-dependence device 160, the second polarization controller 170 and the second optical device 180 are aligned in the horizontal direction D1. Because the first polarization controller 150 and the second polarization controller 170 may be laminated to the first surface 162 and the second surface 164 of the polarization-dependence device 160, respectively, an overall thickness of the folding lens system 100 may be reduced, which is advantageous to miniaturization of the folding lens system 100. In addition, the diopter generated by the light L1 (see FIG. 2) incident on the first polarization controller 150 may be able to adjust by the curvature of the first polarization controller 150, so aberration and optical imaging quality may be improved.

Figure 7:
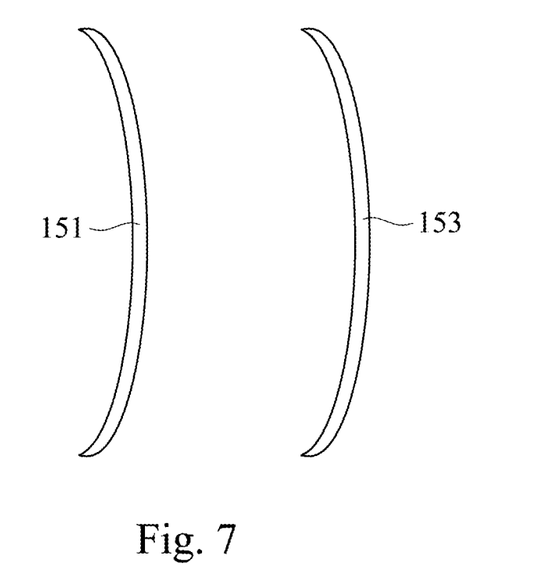
FIG. 7 and FIG. 8 illustrate schematic views at various steps of manufacturing a first polarization controller according to one embodiment of the present disclosure.
Figure 8:
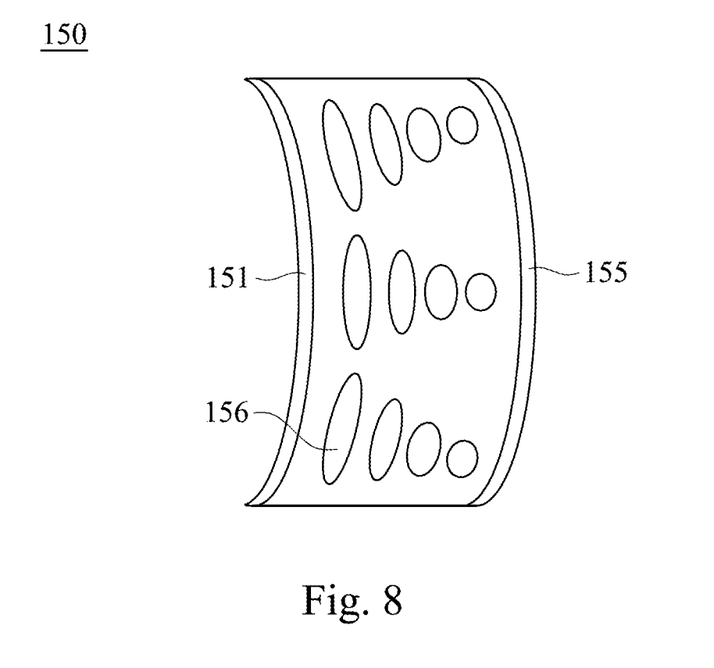

FIG. 7 and FIG. 8 illustrate schematic views at various steps of manufacturing the first polarization controller 150 according to one embodiment of the present disclosure. Referring to both FIG. 7 and FIG. 8, alignment films may be coated on a first curved glass 151 and a second curved glass 153. Next, the first curved glass 151 and the second curved glass 153 may be combined, and an alignment direction of the first curved glass 151 is perpendicular to an alignment direction of the second curved glass 153. Next, first liquid crystals 156 may be filled between the first curved glass 151 and the second curved glass 153 to form the structure as shown in FIG. 8.

Figure 9:
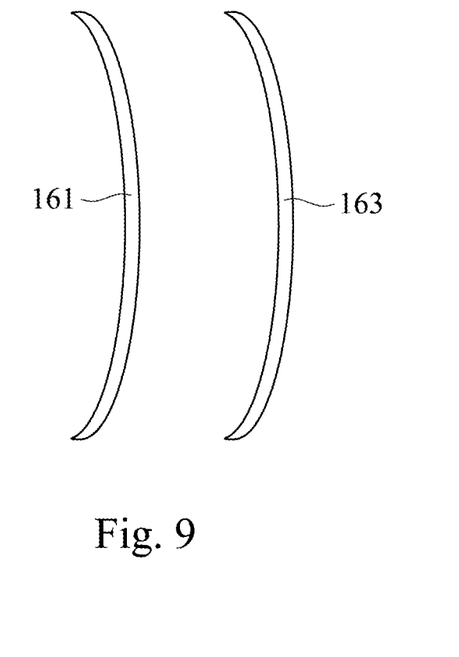
FIG. 9 and FIG. 10 illustrate schematic views at various steps of manufacturing a polarization-dependence device according to one embodiment of the present disclosure.
Figure 10:
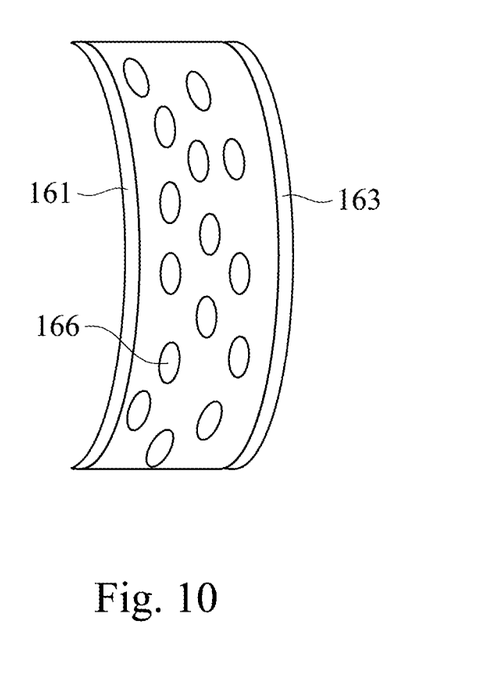

FIG. 9 and FIG. 10 illustrate schematic views at various steps of manufacturing the polarization-dependence device 160 (see FIG. 1) according to one embodiment of the present disclosure. Referring to both FIG. 9 and FIG. 10, alignment films may be coated on a third curved glass 161 and a fourth curved glass 163. Next, the third curved glass 161 and the fourth curved glass 163 may be combined, and an alignment direction of the third curved glass 161 may be parallel and opposite to an alignment direction of the fourth curved glass 163. Next, second liquid crystals 166 mixed with photoinduced curing polymers may be filled between the third curved glass 161 and the fourth curved glass 163.

Referring back to FIG. 1, the second liquid crystals 166 mixed with the photoinduced curing polymers may be exposed, and the third curved glass 161 and the fourth curved glass 163 may be removed to form the polarization-dependence device 160 as shown in FIG. 1. In some embodiments, the first polarization controller 150 has a plurality of the first liquid crystals 156 (see FIG. 8), the polarization-dependence device 160 has a plurality of the second liquid crystals 166, and an arrangement direction of the first liquid crystals 156 is different from an arrangement direction of the second liquid crystals 166.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A folding lens system, comprising:
   a polarization-dependence device having a first surface and a second surface opposite to the first surface;
   a first optical device located at a side facing toward the first surface of the polarization-dependence device, wherein the first optical device has a third surface and a fourth surface opposite to the third surface, and the third surface is a planar surface;
   a first polarization controller located between the polarization-dependence device and the first optical device, wherein the first polarization controller has the same curvature as the first surface of the polarization-dependence device, and the fourth surface of the first optical device is laminated to the first polarization controller;
   a second optical device located at a side facing toward the second surface of the polarization-dependence device; and
   a second polarization controller located between the polarization-dependence device and the second optical device, wherein the second polarization controller has the same curvature as the second surface of the polarization-dependence device.

2. The folding lens system of claim 1, wherein the first polarization controller is laminated to the first surface of the polarization-dependence device.

3. The folding lens system of claim 1, wherein the second polarization controller is laminated to the second surface of the polarization-dependence device.

4. The folding lens system of claim 1, wherein the fourth surface of the first optical device is a curved surface.

5. The folding lens system of claim 1, further comprising:
   a display located at a side of the first optical device facing away from the first polarization controller, wherein the display is configured to emit light to the second polarization controller.

6. The folding lens system of claim 5, further comprising:
   a quarter-wave plate located between the display and the first optical device.

7. The folding lens system of claim 6, further comprising:
   a transflective film located on a surface of the quarter-wave plate facing toward the display.

8. The folding lens system of claim 1, wherein the second optical device has a fifth surface and a sixth surface opposite to the fifth surface, and the fifth surface is a curve surface.

9. The folding lens system of claim 8, further comprising:
   a polarization reflective film located on the sixth surface of the second optical device.

10. The folding lens system of claim 8, wherein the sixth surface of the second optical device is a planar surface.

11. The folding lens system of claim 1, wherein the polarization-dependence device, the first optical device, the second optical device, the first polarization controller, and the second polarization controller are aligned in a horizontal direction.

12. The folding lens system of claim 1, wherein the first polarization controller has a plurality of first liquid crystals, the polarization-dependence device has a plurality of second liquid crystals, and an arrangement direction of the first liquid crystals is different from an arrangement direction of the second liquid crystals.

13. A manufacturing method of a folding lens system, comprising:
   laminating a first polarization controller to a first surface of a polarization-dependence device, wherein the first polarization controller has the same curvature as the first surface of the polarization-dependence device;
   laminating a second polarization controller to a second surface of the polarization-dependence device opposite to the first surface, wherein the second polarization controller has the same curvature as the second surface of the polarization-dependence device;
   laminating a first optical device to a side of the first polarization controller facing away from the polarization-dependence device; and
   laminating a second optical device to a side of the second polarization controller facing away from the polarization-dependence device, wherein the second optical device has a fifth surface and a sixth surface opposite to the fifth surface; and
   forming a polarization reflective film on the sixth surface of the second optical device.

14. The method of claim 13, further comprising:
   disposing a display at a side of the first optical device facing away from the first polarization controller, wherein the display is configured to emit light to the second polarization controller.

15. The method of claim 13, further comprising:
   forming a transflective film on a surface of a quarter-wave plate; and
   laminating the quarter-wave plate to a third surface of the first optical device, wherein the first optical device has a fourth surface opposite to the third surface, and the fourth surface is a curved surface.

16. The method of claim 13, wherein laminating the first optical device and the second optical device is performed such that the polarization-dependence device, the first optical device, the second optical device, the first polarization controller, and the second polarization controller are aligned in a horizontal direction.

17. The method of claim 16, wherein laminating the first optical device and the second optical device is performed such that the first optical device, the first polarization controller, the polarization-dependence device, the second polarization controller and the second optical device are sequentially arranged along the horizontal direction.

* * * * *